US010678381B2

(12) United States Patent
Mickelsen et al.

(10) Patent No.: US 10,678,381 B2
(45) Date of Patent: Jun. 9, 2020

(54) DETERMINING HANDEDNESS ON MULTI-ELEMENT CAPACITIVE DEVICES (71) Applicant: DISH Technologies L.L.C., Englewood, CO (US)

(72) Inventors: Jeremy Mickelsen, Denver, CO (US); Christopher Burns, Centennial, CO (US)

(73) Assignee: DISH Technologies L.L.C., Englewood, CO (US)

( * ) Notice: Subject to any disclaimer, the term of this patent is extended or adjusted under 35 U.S.C. 154(b) by 483 days.

(21) Appl. No.: 14/465,725

(22) Filed: Aug. 21, 2014

(65) Prior Publication Data
US 2016/0054827 A1 Feb. 25, 2016

(51) Int. Cl.
 *G06F 3/044* (2006.01)
 *G06F 3/041* (2006.01)

(52) U.S. Cl.
 CPC ............ *G06F 3/044* (2013.01); *G06F 3/0416* (2013.01)

(58) Field of Classification Search
 CPC .................. G06F 3/044; G06F 3/0416; G06F 3/041–047; G06F 2203/04101–04113
 See application file for complete search history.

(56) References Cited

U.S. PATENT DOCUMENTS

| 4,971,562 | A | 11/1990 | Gleason et al. |
| 6,483,931 | B2 | 11/2002 | Kalnitsky et al. |
| 6,496,021 | B2 | 12/2002 | Tartagni et al. |
| 6,512,381 | B2 | 1/2003 | Kramer |
| 7,239,227 | B1 | 7/2007 | Gupta et al. |
| 8,436,828 | B1 | 5/2013 | Zhai |
| 2007/0174788 | A1* | 7/2007 | Ording ................ G06F 3/04883 715/816 |
| 2008/0278455 | A1* | 11/2008 | Atkins ................ G06F 3/04883 345/173 |
| 2010/0007618 | A1 | 1/2010 | Park et al. |
| 2010/0289754 | A1* | 11/2010 | Sleeman ............... G06F 3/0416 345/173 |
| 2014/0002407 | A1* | 1/2014 | Badaye ............... G06F 3/04883 345/174 |
| 2014/0007006 | A1* | 1/2014 | Pallakoff ............. G06F 3/04886 715/808 |
| 2014/0085220 | A1* | 3/2014 | Gossweiler, III ..... G06F 3/0488 345/173 |
| 2014/0160057 | A1 | 6/2014 | Lee et al. |
| 2014/0189551 | A1 | 7/2014 | Kim |

FOREIGN PATENT DOCUMENTS

| EP | 1 220 139 A2 | 7/2002 |
| WO | 2014/006456 A1 | 1/2014 |

* cited by examiner

Primary Examiner — Stephen G Sherman
(74) Attorney, Agent, or Firm — Seed IP Law Group LLP (57) ABSTRACT A system and method is provided for identifying shadow regions on a multi-element capacitive input device such as a smart phone, and in particular using analysis of shadow regions, where the user may not be in direct contact with the device, to identify more accurately the area on the device the user is selecting, the hand, left or right, used to do the selecting and to identify the user using the device.

20 Claims, 11 Drawing Sheets

DETERMINING HANDEDNESS ON MULTI-ELEMENT CAPACITIVE DEVICES

BACKGROUND

Technical Field

The present disclosure relates to identifying areas of selection and non-selection on a multi-element capacitive device, and more particularly by using the capacitive values of the elements of the device to determine selection and shadow regions.

Description of the Related Art

Many consumer devices today such as iPhones™, iPad™, and smart phones, as well as other devices such as point of sale displays, use multi-element capacitive input devices to capture user input. These capacitive input devices usually include an insulator, for example glass, that is coated with a conductor and where touching the surface of the glass will distort the electrostatic field around the surface of the glass which is measurable as a change in capacitance. Many touch devices include a matrix of capacitive sensors or "cells." In implementation, each individual cell, or cell-pair if the effective capacitance is measured between each pair, on the capacitive input device is able to provide a capacitive measure.

When an object, for example a portion of a finger, touches the surface of the capacitive input device, the capacitive measure of the multiple capacitive cells or cell-pairs near the surface of the touch shows a large value difference from the ordinary capacitance of the cells to indicate a touch. Taken together, these cells normally form a shape. Typically, when an application is using the capacitive device for input to determine where a user has made the selection through a touch, the application will look for the peak of the centroid of the shape or the one cell that shows the highest capacitive change. For example, when using a smart phone, most people when typing use the thumb tip which provides a smaller overall size and more compact shape of cells showing a large capacity value difference at a small area. Applications will then use the centroid of the shape to determine the location on the display that the user selecting.

Applications related to this functionality include: U.S. Pat. No. 6,483,931 to Kalnitsky et al., issued Nov. 19, 2002 directed to a planar fingerprint pattern detecting array; U.S. Pat. No. 6,512,381 to Kramer, issued Jan. 28, 2003, directed to an enhanced fingerprint sensing circuit; U.S. Pat. No. 6,496,021 to Tartagni et al., issued Dec. 17, 2002, directed to making a capacitive distance sensor including one or more sensor cells each with the $1^{st}$ and $2^{nd}$ capacitor plate; U.S. Pat. No. 7,239,227 to Gupta et al., issued Jul. 3, 2007, directed to a command interface using a fingerprint sensor input system.

BRIEF SUMMARY

This application discloses using a capacitive shadow that is cast when a user's finger, is close to, but not in direct contact with a multi-element capacitive device. The corresponding nearest capacitive elements, typically immediately below the portion of the finger that is not touching, will register a change in their capacitive values. This area is called a "shadow" because the elements within it have a lower capacitive value as compared to the capacitive value of elements near where the finger is touching. Depending upon the sensitivity of the capacitive input device, the user could either be lightly touching the shadow area, or be in close proximity to the surface of the shadow area. Once identified, the shadow may be used in a number of ways, for example to subtract the area of the shadow from the area of overall capacitive change to determine an actual touch area, to determine when a finger is hovering over but not touching a button on the capacitive input device, to determine who the user is, to determine the handedness of the user, or to determine which finger of which hand the user is using to interact with the input device, to name a few.

DETAILED DESCRIPTION

Figure 1:
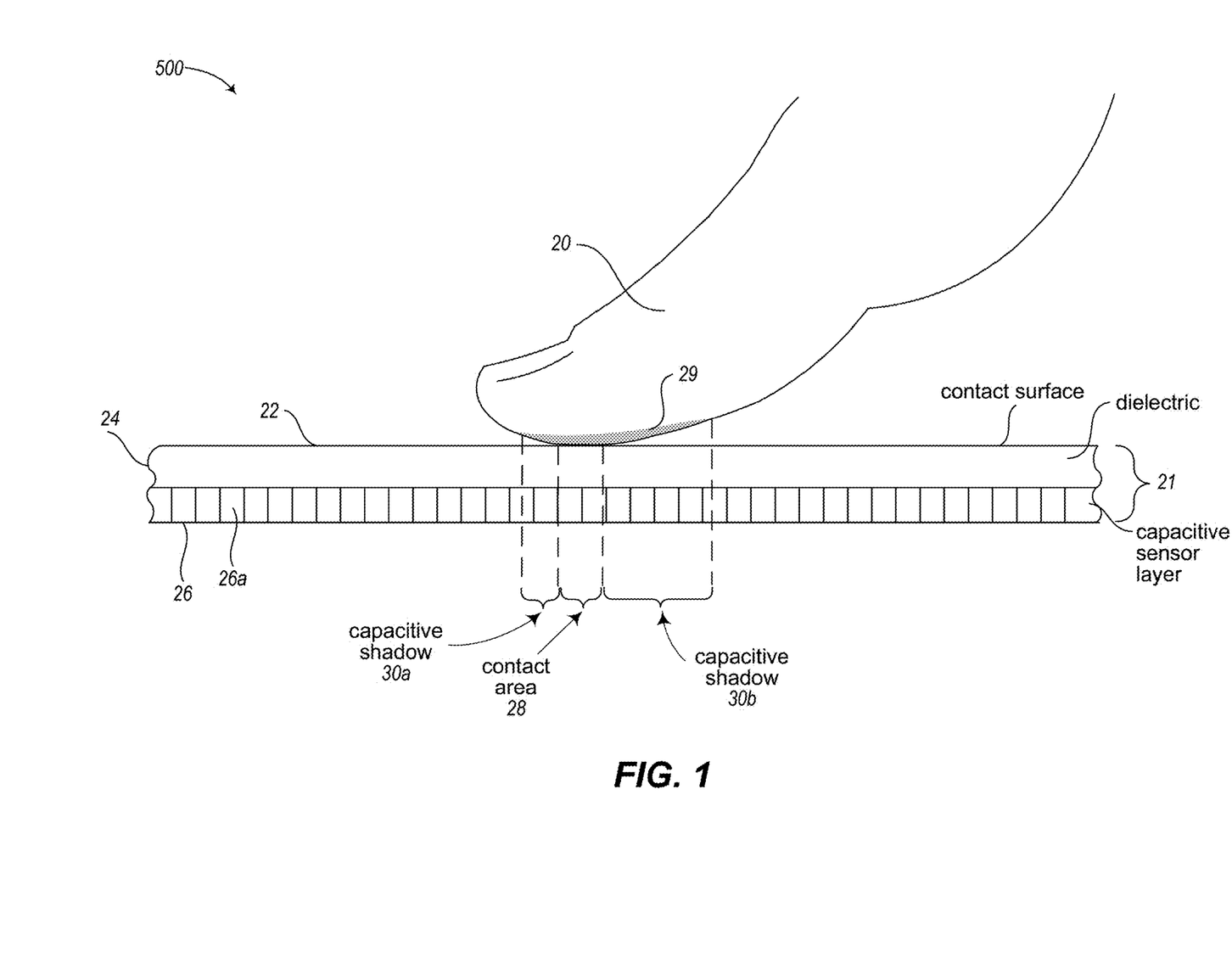
FIG. 1 shows one embodiment of a user interacting with a multi-element capacitive device.

FIG. 1 includes diagram 500 which shows one example of a user using a multi-element capacitive input device. A device can be a smart phone, tablet, iPad, computer screen, the screen of a point-of-sale device, kiosk and the like. The surface of the device 21 has a contact surface 22 which is the uppermost layer that comes into physical contact with an object, such as a user's thumb 20. As used herein, the terms "thumb" or "finger" each include within their meaning both thumbs and fingers as well as any digit or part of a hand, arm, or foot that might be used to select a spot on a capacitive touch pad. In other examples, instead of a thumb the object used may be another finger, a stylus, or other object that may be used to interact with the capacitive input device.

The contact surface 22 may be a surface of a dielectric 24, such as a sheet of plastic or a sheet of tempered glass such as Gorilla™ glass. Immediately below the dielectric layer 24 is the capacitive sensor layer 26 containing an array or matrix of tightly packed capacitive sensor elements 26a. Each of these sensor elements 26a have an identifiable location and can provide at least a normal capacitive value for the sensor elements when not engaged, and a capacitive value when engaged, for example when a thumb 20 is placed upon a location on the contact surface 22 at or near the sensor element 26a. Examples of sensor elements 26a are further described in FIGS. 2A-2D.

In one example, a thumb 20 is placed in contact with contact surface 22. The contact area 28 is the area of the thumb 20 that is in actual physical contact with the contact surface 22. The sensor elements directly beneath the contact area 28 will show the largest capacitive value change. In addition, areas of thumb 20 that are extremely close to the contact surface 22 but not quite in physical contact with it will create capacitive shadow areas 30a, 30b under which sensor elements will show some capacitive value change, but not as much value change as in those sensor elements under the contact area 28. Therefore, the total surface of thumb 20 that is affecting capacitive sensor layer 26 is seen as the thumb's shaded area 29, and this area is altering the capacitive values of the sensors that make up the contact area 28 and the capacitive shadow areas 30a and 30b.

Figure 2A:
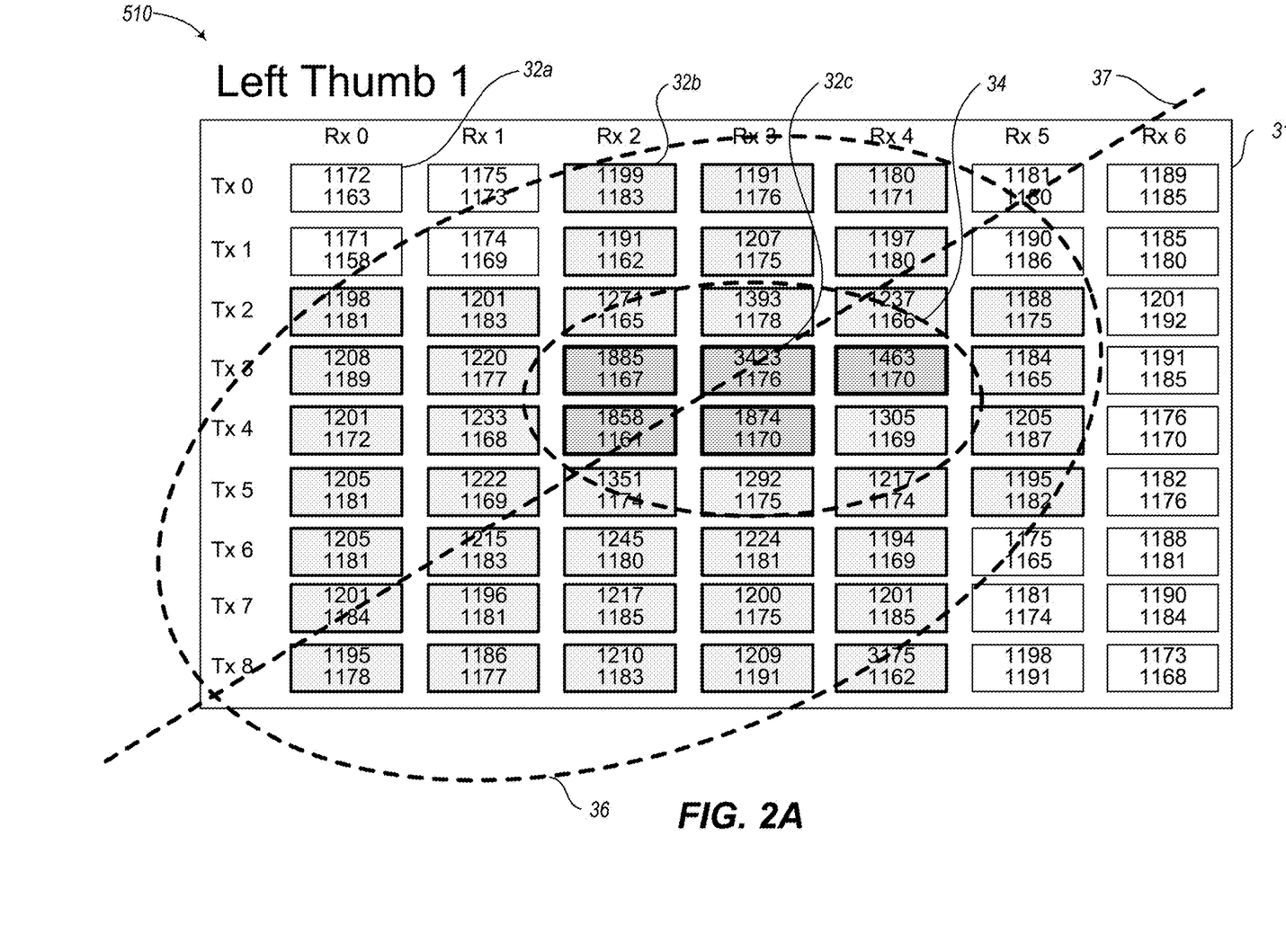
FIG. 2A shows an example of an array of elements on a multi-element capacitive device corresponding to a selection on the device by a first left thumb.

FIG. 2A includes diagram 510 which shows an example array of capacitive sensor elements 31. In this example, there are three different groups of values for each sensor element. For one element 32a that falls outside of the contact area 34 and the shadow area 36, the normal capacitive value is 1163 and the reported capacitive value is 1172, the difference of which is too small to indicate an area of contact or shadow. For another element 32b that falls outside of contact area 34 but within shadow area 36, the normal capacitive value is 1183 and the reported capacitive value is 1199, the difference which is large enough to indicate it belongs in a shadow area. For another element 32c that falls within contact area 34, the normal capacitive value is 1176 and the reported capacitive value is 3423, which is a difference large enough to indicate an area of contact. Grouping those capacitive elements into three regions and fitting an ellipse to them gives a contact area 34 and a shadow area 36.

Examining the shadow region 36 and contact region 34 gives an indication of the direction and handedness of the thumb that is placed array 31. In one embodiment, handedness can be identified by identifying the shadow region 36 as an ellipse and then determining the semi-major axis of the ellipse 37. From the angle of the semi-major axis 37 and the orientation of the array 31, an accurate estimation of which thumb is used can be made. For example, if the semi-major axis runs lower left to upper right, the left thumb is likely being used. Performing a similar analysis repeatedly, for example determining the semi-major axis of the shadow to determine which hand is being used, over a certain time period, can be used to further increase the reliability in determining the handedness of the user of the device. In another embodiment, the handedness can be identified by considering the position of the contact region within the shadow region. For example if the contact region 34 was in the upper left area of shadow area 36, a left thumb is likely being used.

In addition, other attributes of the user may also be determined by examining shadow and contact regions. For example, the shadow area 36 in FIG. 2A is relatively large in comparison to the contact area 34. This may indicate that when the user makes selections on the array of capacitive sensor elements 31 the user's thumb 20 is relatively flat and parallel with the contact surface 22. Furthermore, this selection behavior by the user may indicate a style preference for interacting with the device, and may be matched to known capacitive input device traits of different device users to determine which user is currently using the device.

It should also be noted that embodiments of this invention may be used separately or in combination to improve accuracy of the attributes of the user to be determined.

Figure 2B:
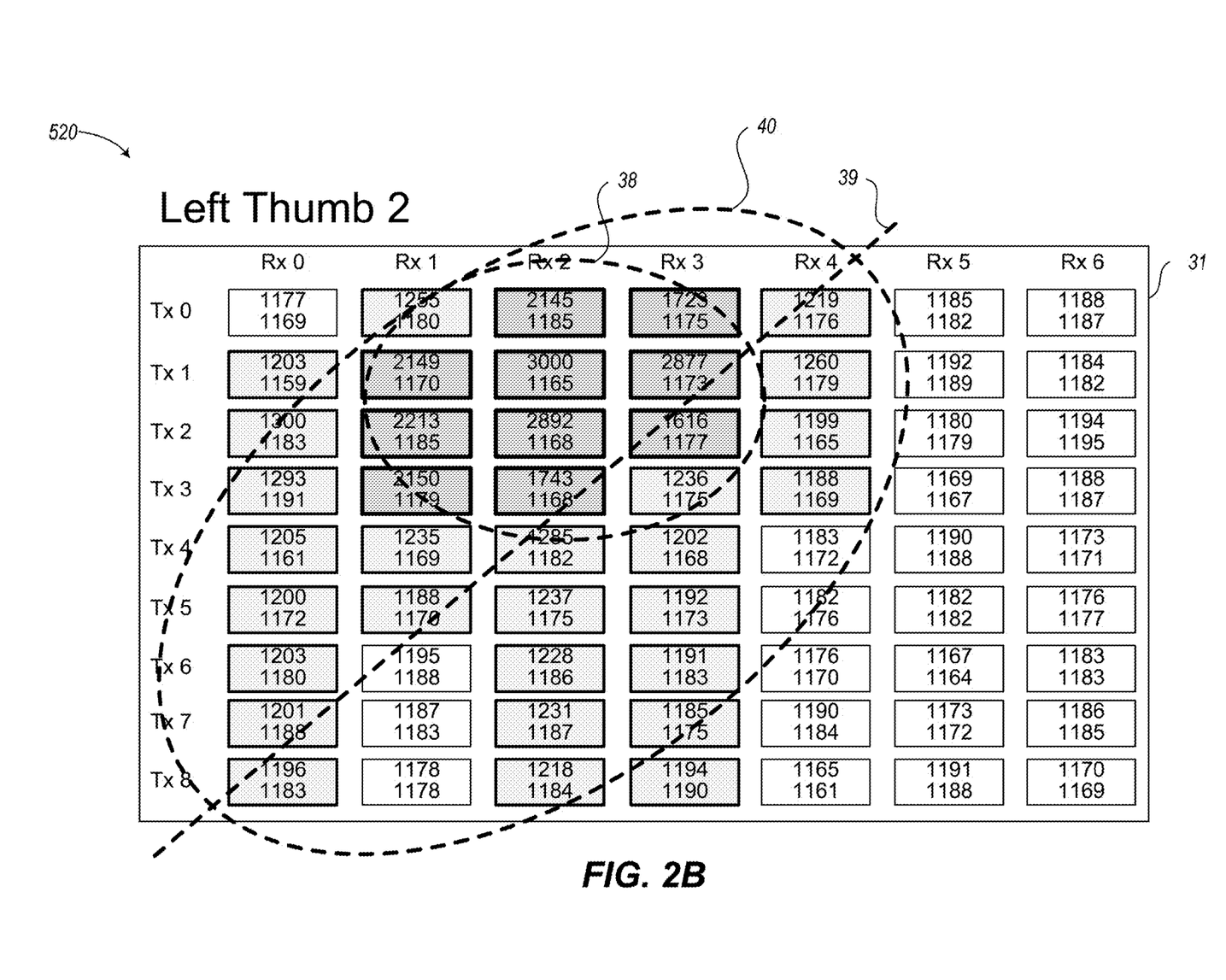
FIG. 2B shows an example of an array of elements on a multi-element capacitive device corresponding to a selection on the device by a second left thumb.

FIG. 2B includes diagram 520 which shows another example array of capacitive sensor elements 31 having different capacitive values. Here, the shadow area 40 is identified as an ellipse with semi-major axis 39 that slopes from lower left to upper right and indicates, similar to FIG. 2A, that the user is using a left thumb 20. That the contact area 38 is significantly bigger with respect to the shadow area 40, may indicate, for example, that the user is pressing with the tip of the thumb. In addition, the slope angle of the semi-major with respect to the direction of the array 31 indicates that the thumb is more vertically oriented as compared to FIG. 2A.

Figure 2C:
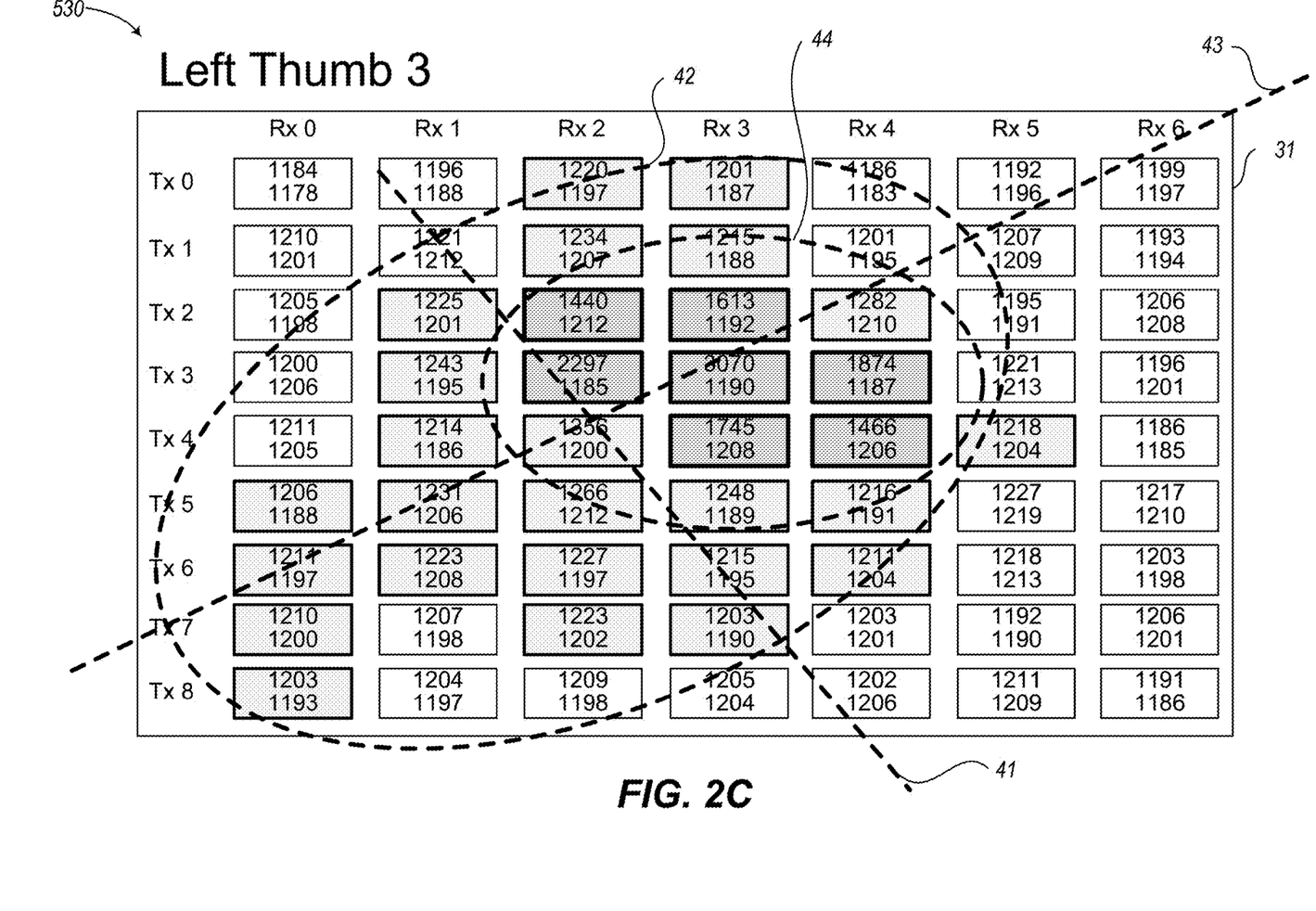
FIG. 2C shows an example of an array of elements on a multi-elements capacitive device corresponding to a selection on the device by a third left thumb.

FIG. 2C includes diagram 530 which shows another example array of capacitive sensor elements 31 having different capacitive values. Here, the shadow region 42 and its semi-major axis 43 direction indicate, similarly to FIGS. 2A and 2B, that the user is using a left thumb to touch the input device. However, an analysis of the semi-minor axis of the shadow region 42 indicates the elliptical region is narrower than in FIGS. 2A and 2B which suggests that a different person with smaller fingers may be interacting with the device.

Figure 2D:
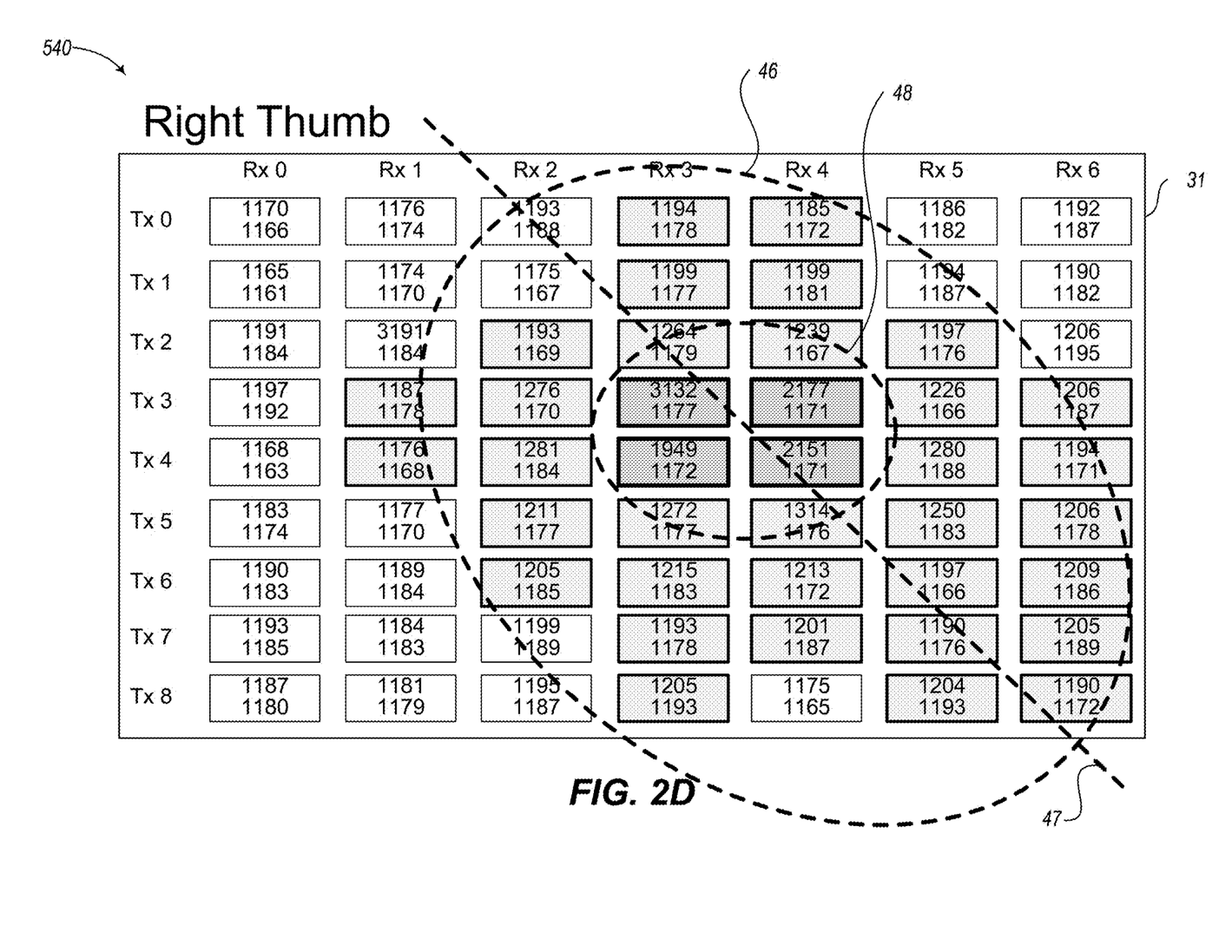
FIG. 2D shows an example of an array of elements on a multi-elements capacitive device corresponding to a selection on the device by a right thumb.

FIG. 2D includes diagram 540 which shows yet another example array of capacitive sensor elements 31 having different capacitive values. Here, the shadow region 46 has a semi-major axis 47 that goes from the lower right to the upper left, the angle of which indicates that a right thumb is being used to make selections on the device.

Figure 3A:
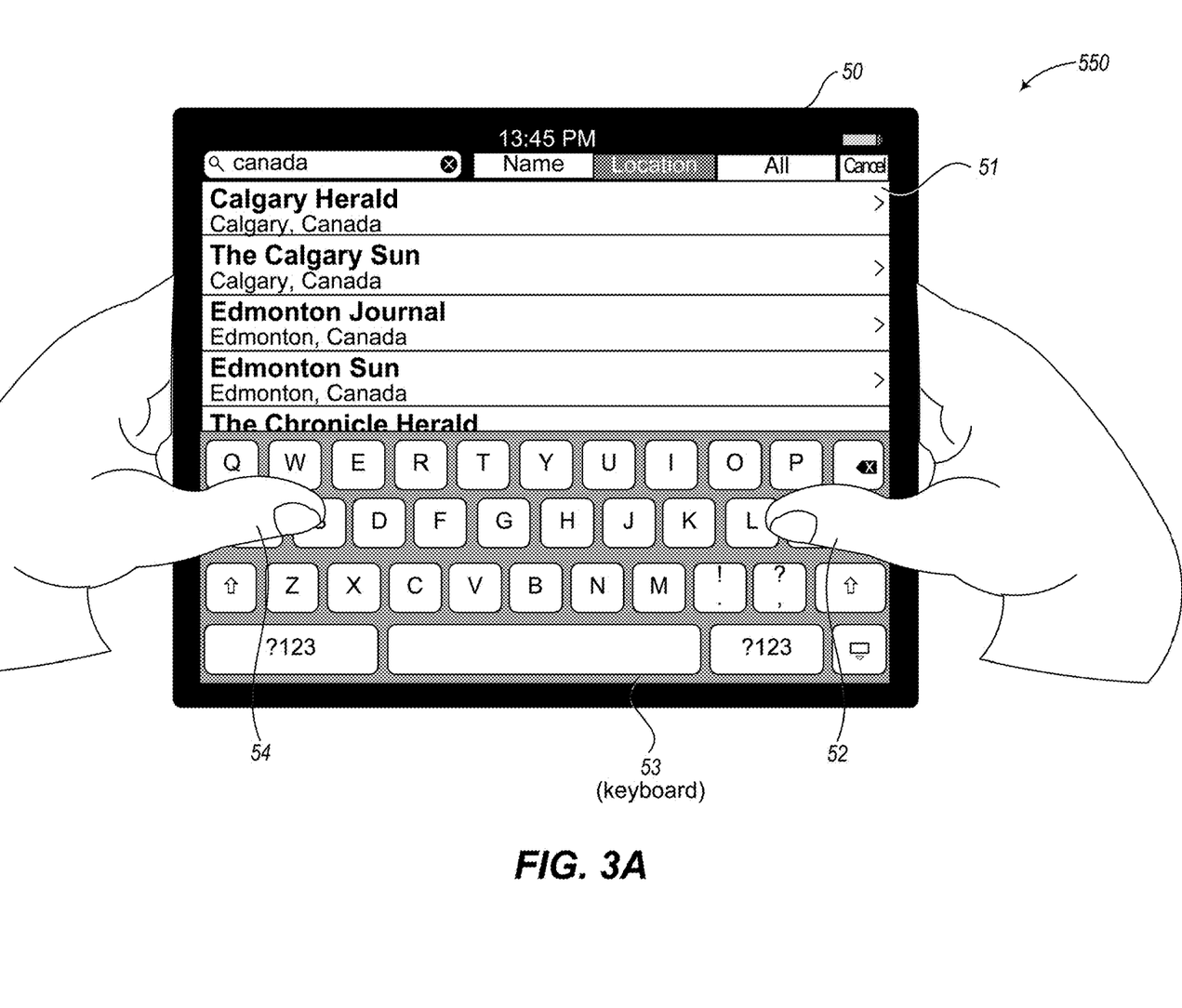
FIG. 3A shows an example of a user interacting with a keyboard on a tablet having a multi-element capacitive input device.

FIG. 3A includes diagram 550 of an example of a user interacting with tablet 50 having a display 51. The display 51 includes a keyboard 53 that is used to enter letters, numbers, symbols and other such characters used as input to the software application used to drive the contents on display 51. In at least one embodiment, the keyboard is displayed on the capacitive input device display based on a software application. In this example, the user is typing in data into the software application and is displayed on the screen 51, using a left thumb 54 and a right thumb 52 to make selections on keyboard 53.

Figure 3B:
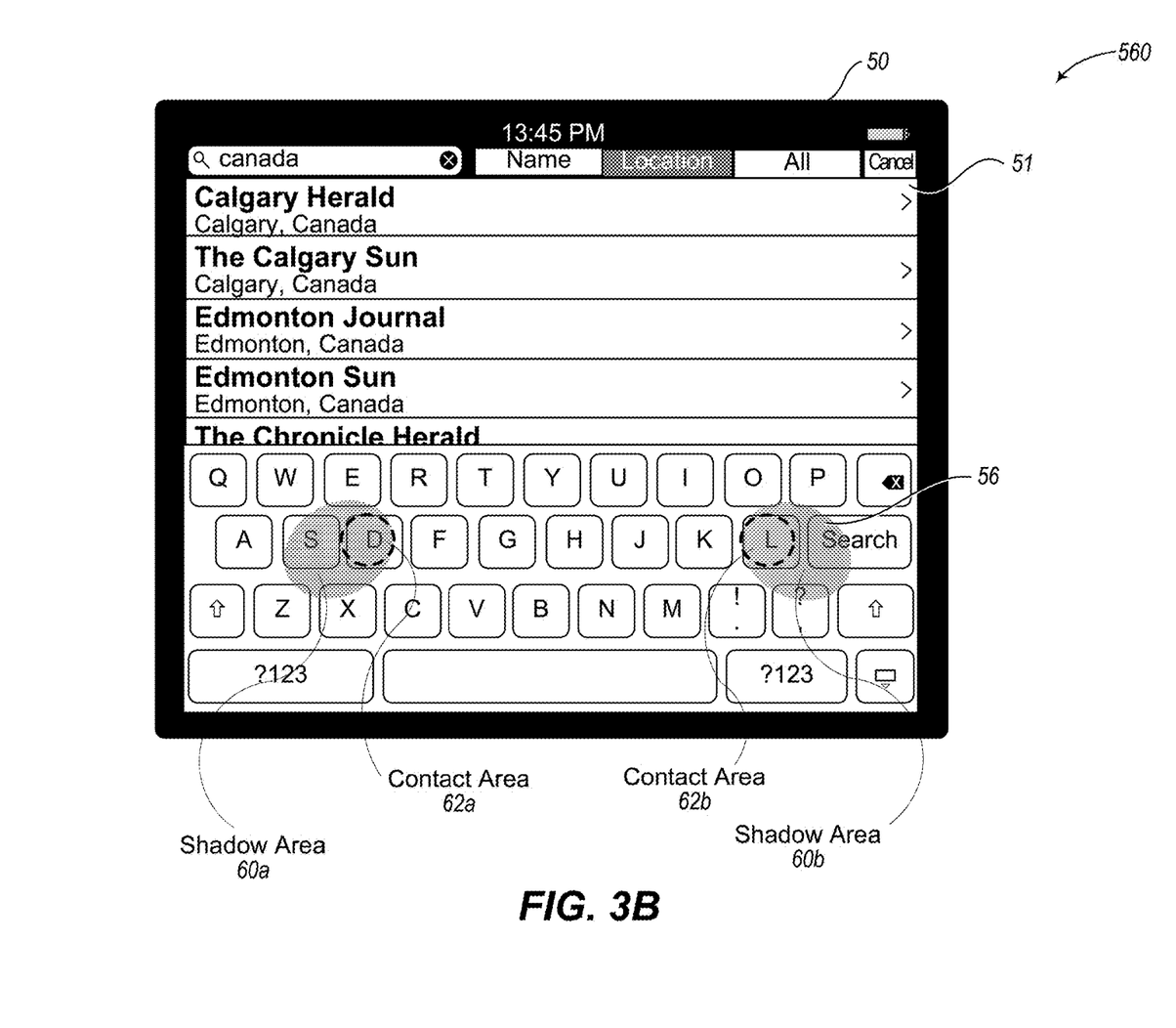
FIG. 3B shows an example of the difference in capacitive values resulting from the activity shown in FIG. 3A.

FIG. 3B includes diagram 560 of an example of display 51 that shows one embodiment of contact and shadow areas from two-thumb use. The left-thumb shadow area 60a and contact area 62a represent the result of thumb 54 placed in contact with or near the surface of the capacitive input device 51, and the subsequent analysis of the capacitive sensor elements of the device. The right-thumb shadow area 60b and contact area 62b represent the result of thumb 52 placed in contact with or near the surface of the capacitive input device 51, and the subsequent analysis of the capacitive sensor elements of the device. In this example, the application processing the capacitive sensor elements, or an associated subsystem used by the application, analyzes the value of the capacitive sensor elements of the device to determine the respective shadow and contact areas in order to identify the appropriate input from the user. For example, shadow area 60a and contact area 62a together make an input area identifying capacitive sensor elements that have a capacitive value above a certain threshold. In one or more embodiments, an application would identify contact area 62a by subtracting the shadow area 60a from the overall area having a capacitive value above the threshold to determine more accurately the exact contact area 62a. This way, by subtracting the shadow area, the system is able to more accurately identify the contact area and therefore more accurately identify the input selection from the user. In this case, the left thumb is selecting "D" 62a and the right thumb is selecting "L" 62b.

Figure 4:
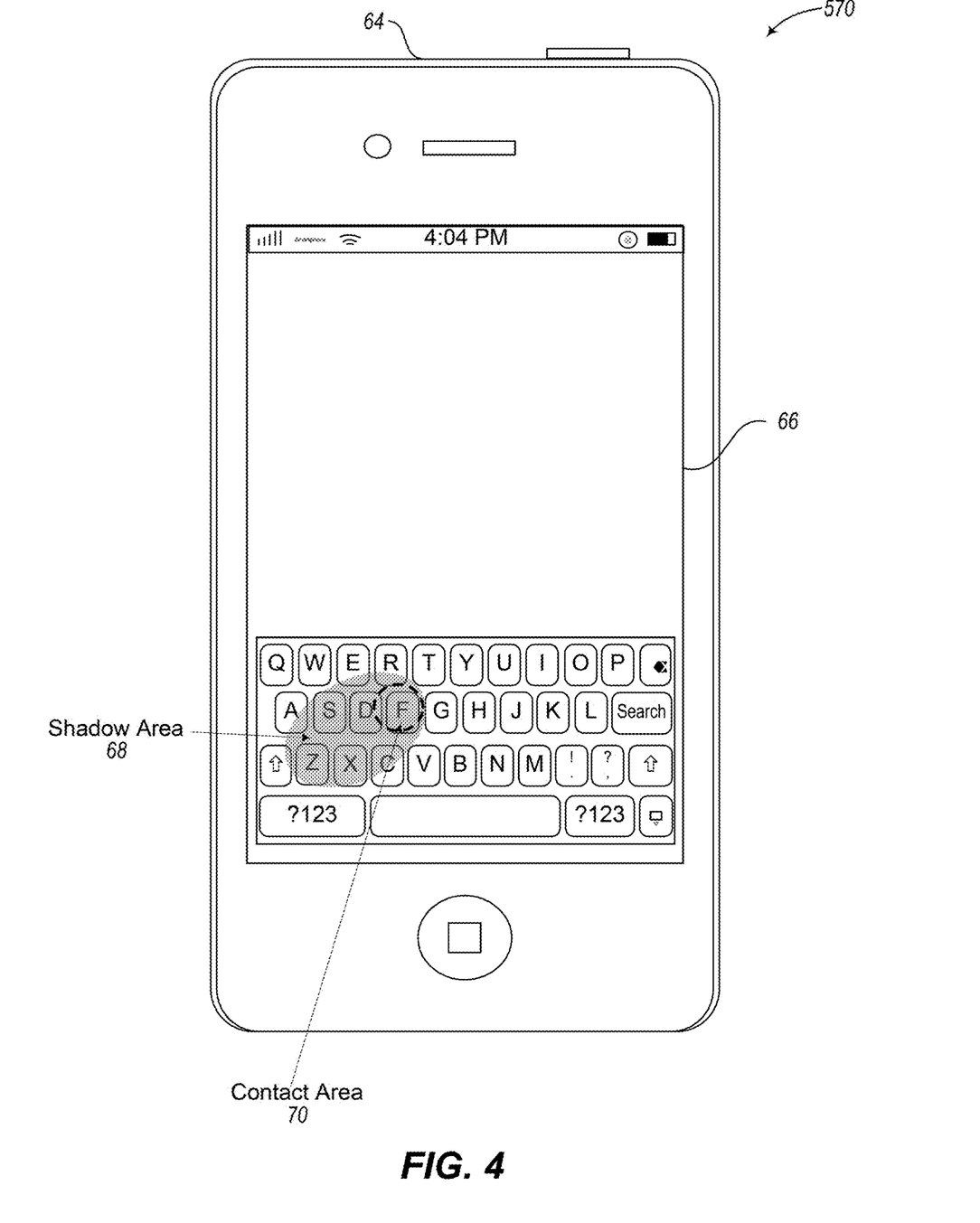
FIG. 4 shows an example of areas of capacitive difference on the multi-elements capacitive input display for a smart phone.

FIG. 4 includes diagram 570 of an example of a user interacting with a smart phone 64 that has display 66. In this example, the user is using the thumb of the left hand to interact with the device. The placement of the user's left thumb over display 66 creates a shadow area 68 with a contact area 70, in this case selecting the letter "F." In one embodiment, from an analysis of the shadow area 68, once the handedness of the user is reliably determined, for example as described above, the application running on the device may take advantage of this information to modify the appearance of the display 66 in order to make data input easier for the user. For example, if the application determined the user is left-handed, the application may place images to be viewed but not selected, such as navigation images, graphics, explanations, or the like in the upper right area of the display 66 to make it easier for the user to interact with the application while providing input. Similarly, if the application determined the user is right-handed, the application may place navigation information and the like in the upper left area of the display 66. The display may have other custom changes made, such as placement of keys, sizes, and other changes to accommodate the handedness or thumb size of the user.

For example, if the user is repeatedly just missing the letter or icon, the display can, without user input or the user even knowing it, make the letters 5% or 7% larger, or shift the sensing location slightly to be directly under where the user is expected to press to select a certain icon rather than where the icon truly appears on the screen.

Figure 5:
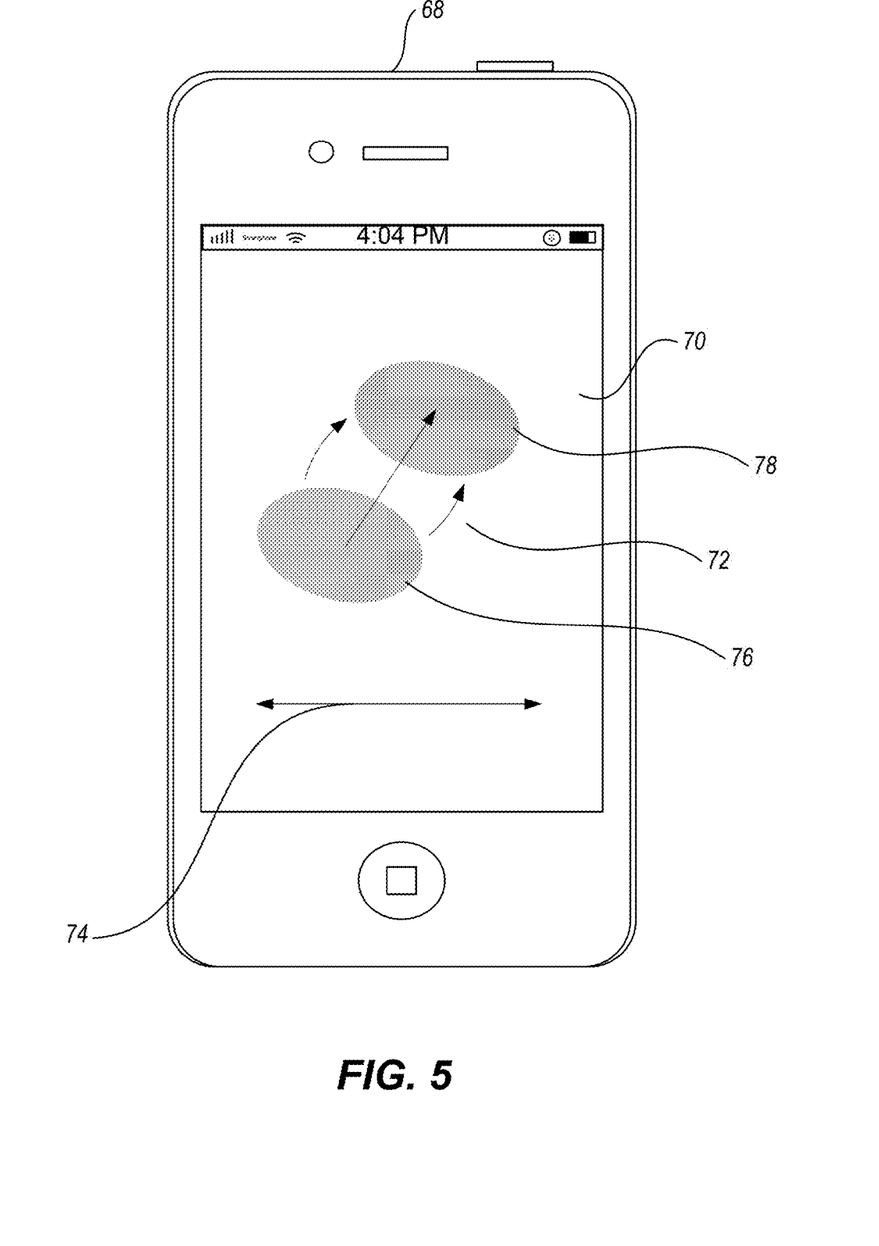
FIG. 5 shows an example of the motion of a shadow area on multi-element capacitive input display for an iPhone™.

FIG. 5 includes diagram 590 of an example of a user interacting with a smart phone 68 with a display 70. In this example, the user is using a thumb from the right-hand (not shown) placed at or near the display 70 to create a capacitive shadow 76. As described previously, the capacitive shadow 76 represents capacitive values of capacitive sensor elements in an array that are above a threshold value. This shadow 76 may include areas where the thumb is in contact with the input device 70 as well as areas of the thumb that are in close proximity to the device. The user may provide input to the application driving the smart phone 68 by moving the thumb, for example in direction 72 to a final location 78. In one or more embodiments, the application would determine the user's intentions by determining the shadow area as described above, and then examine how that entire area has moved over time.

Alternatively, the user may move the shadow in a side to side direction 74. The application may therefore take advantage of changes in the shape as well as in the position of the shadow 76, 78. In one example, a "swipe" 72 of a shadow 76 on a screen may indicate the movement of an underlying image on screen (not shown), or a rotation of a shadow 76 on display 70, may rotate an underlying image (not shown). In some examples the rotation of the shadow may be identified and used as input to the application, even though the centroid point the contact area of the thumb on the screen (not shown) has not moved.

Figure 6:
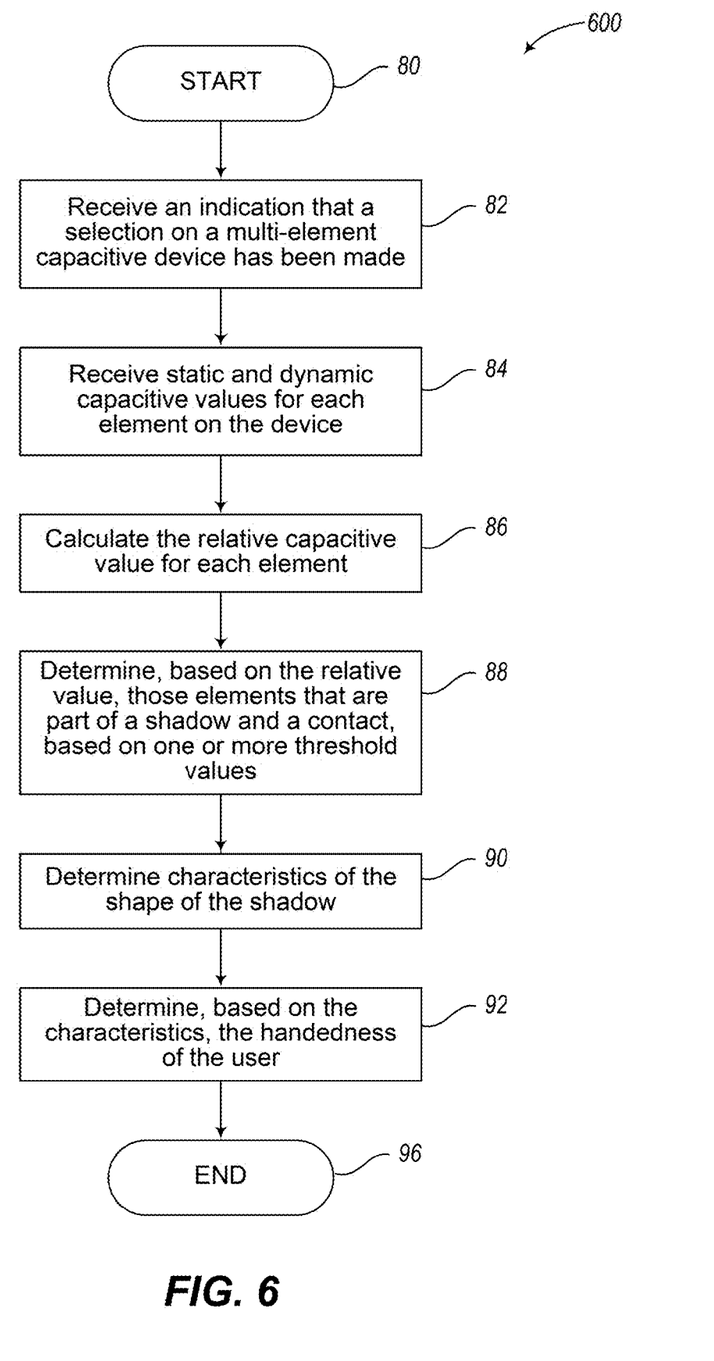
FIG. 6 shows an example flowchart for determining the shadow, handedness and selection on a multi-element capacitive input device.

FIG. 6 shows an example flow chart 600 for determining the shadow, handedness and selection on a multi-element capacitive input device. The process describes one embodiment of one example. The process begins at the start 80. The first step 82 of the process is to receive an indication that a selection on a multi-element device has been made. For example, the device identifies when a finger or stylus come into contact or into close proximity with the contact surface 22 of the device. At the next step 84, the process receives both static and dynamic capacitive values for each element on the device 84. The static value is the long-term constant value with no input. The dynamic value is the changed value over time as the user interacts with the input pad. At the next step of the process, the relative capacitive value for each element is calculated 86. At the next step 88 of the process, the relative capacitive value for each element is compared with one or more threshold values to determine those elements that are part of the shadow, contact, or neither. In one embodiment, threshold values are compared to the numeric relative value of each element to determine whether a threshold has been met. In other embodiments, the capacitive value of neighboring elements may be considered to determine a relative value for a particular element. At the next step 90 in the process, the characteristics of the shape of a shadow that has been identified based on, for example, a threshold value, is determined. In some examples, this shape may group individual elements together to form an irregular shape. In other examples, a regular form may be fit to the position of the elements such as a circular or elliptical form applied in a "best fit" way to the group of elements. Characteristics of the shape of the shadow will differ depending on the form taken. For example, if the shape takes the form of an ellipse, then the characteristics may be the dimension, shape and direction of the semi-major and semi-minor axes of the ellipse.

At the next step 92 of the process, the handedness of the users determined based on the determined characteristics of the shape of the shadow. In one example embodiment, if the shape is fit to an ellipse, and the semi-major axis is significantly longer than the semi-minor axis, then the direction of the semi-major axis is likely the direction of the thumb, and the angle of this axis in relation to the top of the screen will determine which hand is being used to make the selection. Finally, the process ends 96.

Figure 7:
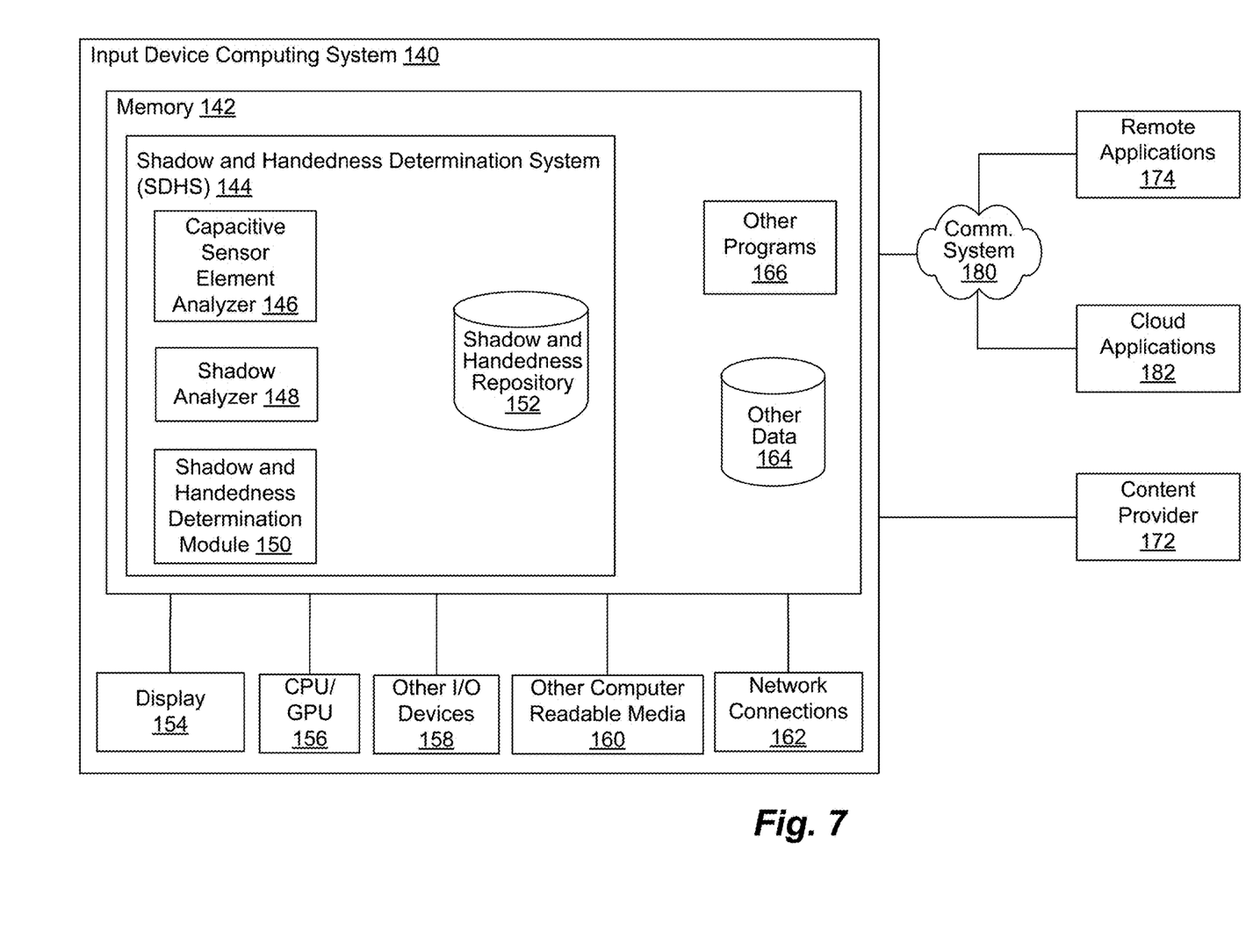
FIG. 7 is a schematic diagram of a computing environment in which systems and methods for identifying and analyzing shadow areas are implemented.

FIG. 7 includes diagram 610 of a computing system for implementing embodiments of shadow and handedness determination system (SHDS). FIG. 7 includes a computing system 140 that may be utilized to implement a shadow and handedness determination system ("SHDS") system 144 with features and functions as described above. One or more general-purpose or special-purpose computing systems may be used to implement the SHDS system 144. More specifically, the computing system 140 may include one or more distinct computing systems present having distributed locations, such as within a smart phone, a tablet, a set-top box, or within a personal computing device. In addition, each block shown may represent one or more such blocks as appropriate to a specific embodiment or may be combined with other blocks. Moreover, the various blocks of the SHDS system 144 may physically reside on one or more machines, which may use standard inter-process communication mechanisms (e.g., TCP/IP) to communicate with each other. Further, the SHDS is system 144 may be implemented in software, hardware, firmware or in some combination to achieve the capabilities described herein.

In the embodiment shown, computing system 140 includes a computer memory 142, a display 154, one or more Central Processing Units ("CPU") 156, which may also include one or more graphical processing units ("GPU") or Microcontrollers, Input/Output devices 158 (e.g., an input device with an array of tightly packed capacitive sensor elements such as a tablet, smart phone, kiosk, point of sale display and the like; keyboard, mouse, joystick, track pad, haptic device, LCD display and the like), other computer-readable media 160 and network connections 162 (e.g., internet network connections). In other embodiments, some portion of the contents of some or all of the components of the SHDS system 144 may be stored on and/or transmitted over other computer-readable media 160 or over network connections 162. The components of the SHDS system 144 preferably execute on one or more CPUs 156 and generate content from images and other information put into the system by users, as described herein. Other code or programs 166 (e.g., a Web server, a database management system, and the like) and potentially other data repositories, such as data repository 164, may also reside in the memory 142, and preferably execute on one or more CPUs 156. Not all of the components in FIG. 7 are required for each implementation. For example, some embodiments embedded in other software do not provide means for user input, for display, for a customer computing system, or other components, such as, for example, a set-top box or other receiving device receiving audiovisual content.

In a typical embodiment, the SHDS system 144 includes a capacitive sensor element analyzer 146, a shadow analyzer 148, a shadow and handedness determination module 150 and a shadow and handedness repository 152. Other and/or different modules may be implemented. In addition, the SHDS system 144 interacts with communication system 180, cloud applications 182, content providers 172 and the like.

The capacitive sensor element analyzer 146 performs at least some of the functions of analyzing capacitive sensor values and locations as described with reference to FIG. 2A through FIG. 5. In particular, the capacitive sensor element analyzer 146 interacts with the viewer 20 and other systems to identify and analyze the capacitive values of the capacitive elements of the input device, for example with respect to one or more threshold values. This data is then used to identify locations on the input device, which may or may not be associated with a display device or be the same device. The data may also be retrieved from data source 164 within computing system 140 or elsewhere from data accessible via network connection 162. In one embodiment, this information is stored in the shadow and handedness repository 152 for processing by other components of the SHDS system 144.

In some embodiments, the capacitive sensor element analyzer 146 may act as a content cache manager, such that it preferentially provides content to other components such as the shadow analyzer 148 or shadow and handedness determination module 150.

The shadow analyzer 148 performs at least some of the functions of determining areas of shadow and contact presented on the display as described in FIG. 2A through FIG. 4. In particular, the shadow analyzer takes information from the capacitive sensor element analyzer 146 and identifies areas on the display where shadows and contact areas exist. In some embodiments, the display shadow analyzer 148 also determines geometric shapes, and/or other methods of abstracting the determined shadow shape made by a contact or close proximity to an input surface to determine those areas where a shadow exists and where contact has been made on the contact surface 22 as described herein.

The shadow and handedness determination module 150 performs at least some of the functions described above of identifying the location and orientation of shadows and determining the handedness, for example whether the left or right thumb is being used as input for an application, associated with an input event. This may involve further processing output from the shadow analyzer 148 to determine, in one embodiment, how characteristics of the shadow or contact area shape are processed by examining the semi-major and semi-minor axes of overlaid ellipses to determine handedness.

The shadow and handedness determination module 150 receives data about the user input selection from the capacitive sensor element analyzer, the shadow analyzer, and/or capacitive value data from the input device itself. Information can also be received from the shadow and handedness repository 152.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method comprising:
distinguishing between contact regions and shadow regions on a surface of a capacitive input pad by comparing capacitance values with two separate, independent thresholds, the distinguishing including:
receiving an indication of a thumb being placed on the surface of a capacitive input pad, the capacitive input pad having a plurality of sensing cells arranged near the surface in a closely-spaced physical configuration;
receiving a respective capacitive value associated with each respective sensing cell of the plurality of sensing cells, the capacitive value having a defined relation to a proximity of the thumb to the respective sensing cell;
comparing the capacitive value for each sensing cell of the plurality of sensing cells to a first fixed threshold value and to a second fixed threshold value, the first and second threshold values being independent of the capacitive values of the plurality of sensing cells;
storing the results of the comparison; and
identifying from the results of the comparison:
a first set of the plurality of sensing cells, each sensing cell of the first set having a capacitive value greater than the first fixed threshold value,
a second set of the plurality of sensing cells, each sensing cell of the second set having a capacitive value greater than the first fixed threshold value and less than the second fixed threshold value, the second fixed threshold value being greater than the first fixed threshold value, and
a third set of the plurality of sensing cells, each sensing cell of the third set having a capacitive value less than the first fixed threshold; and
outputting an indication of the first set of the plurality of sensing cells, the second set of the plurality of sensing cells and the third set of the plurality of sensing cells.

2. The computer-implemented method of claim 1 wherein the outputting an indication includes:

outputting an indication of a fourth set of the plurality of sensing cells, the fourth set of the plurality of sensing cells resulting from subtracting the second set of the plurality of sensing cells from the first set of the plurality of sensing cells.

3. The computer-implemented method of claim 2 further comprising:
identifying a fifth set of the plurality of the sensing cells, the fifth set corresponding to a defined input sub-region on the surface of a capacitive input pad, the sub-region corresponding to one of a plurality of activation areas on the surface of the capacitive input pad, the plurality of activation areas providing user input or output for a processor-controlled application;
comparing the fifth set of the plurality of the sensing cells to the fourth set of the plurality of the sensing cells;
determining, from the comparison, whether the placement of the thumb has caused the activation area to be selected; and
outputting an indication of the selected activation area.

4. The method of claim 3 further comprising:
determining a thumbprint map based on a geometric shape of the second set of the plurality of sensing cells and the value of each cell of the second set of the plurality of sensing cells;
comparing the determined thumbprint map to a known thumbprint map of a user; and
based on the results of the comparison, outputting an indication of whether the determined thumbprint map matches the thumbprint map of the user.

5. The computer-implemented method of claim 1 wherein the indication of the thumb being placed on the surface includes an indication of at least a portion of the thumb being placed closely adjacent to, but not touching, the surface of the capacitive input pad.

6. The computer-implemented method of claim 1 further comprising:
determining an orientation of the surface of the capacitive input pad relative to a user;
comparing an orientation of the first set of the plurality of sensing cells to the determined orientation of the surface of the capacitive input pad;
identifying, based on the orientation comparison, an angular difference between the orientation of the surface of the capacitive input pad and the orientation of the first set of the plurality of sensing cells;
determining, based on the angular difference, whether a left or right thumb is in contact with the surface of the capacitive input pad; and
outputting an indication of whether the left or right thumb is in contact with the surface of the capacitive input pad.

7. The computer-implemented method of claim 6 further comprising:
repeating the steps of determining whether the left or right thumb is in contact with the surface of the capacitive input pad; and
identifying, based on the number of determined results, which of the left or right thumb is most frequently used; and
outputting an indication of whether the user is right or left handed.

8. The computer-implemented method of claim 6 wherein outputting the indication of whether the left or right thumb is in contact with the surface of the capacitive input pad further comprises outputting the indication of whether the left or right thumb is in contact with the surface of the capacitive input pad to a processor-controlled application that determines a plurality of activation areas displayed on the capacitive input pad indicating user input or output areas.

9. A method, comprising:
displaying a plurality of user-selectable input elements on a display coupled to a capacitive input pad;
sensing, by a plurality of sensing cells of the capacitive input pad, a touch by a user on a surface of the capacitive input pad;
outputting a respective capacitive value associated with each respective sensing cell;
determining, based on the respective capacitive value associated with each respective sensing cell, a position of the sensed touch on the surface of the capacitive input pad by comparing capacitance values with two separate, independent thresholds;
determining, based on the respective capacitive value associated with each respective sensing cell, whether the sensed touch indicates a touch by a left thumb or a right thumb of the user;
determining, based on an analysis of past input selections made by the user using the determined left thumb or right thumb, a predicted intended position of the touch without a touch being sensed at the predicted intended position, the predicted intended position being a shifted position of the sensed touch on the surface of the capacitive input pad; and
selecting one of the plurality of user-selectable input elements based on the shifted position of the sensed touch.

10. The method of claim 9, wherein determining the position of the sensed touch on the surface of the capacitive input pad includes:
comparing the output capacitive value for each sensing cell to a first predetermined threshold value and to a second predetermined threshold value that is less than the first predetermined threshold value;
determining a contact region by identifying, based on the comparison, a first set of the sensing cells, each sensing cell of the first set having a capacitive value greater than the first predetermined threshold value; and
determining a shadow region by identifying, based on the comparison, a second set of the sensing cells, each sensing cell of the second set having a capacitive value greater than the second predetermined threshold and less than the first predetermined threshold value.

11. The method of claim 10 wherein the first and second predetermined threshold values represent respective first and second threshold increases in capacitive value above a normal capacitive value for the sensing cells.

12. The method of claim 9, wherein determining whether the sensed touch indicates a touch by the left thumb or the right thumb of the user includes:
determining a shape and an orientation of the shadow region; and
determining, based on the determined shape and orientation of the shadow region, whether the sensed touch indicates a touch by the left thumb or the right thumb of the user.

13. The method of claim 12, further comprising outputting an indication of whether the left or right thumb is in contact with the surface of the capacitive input pad.

14. The method of claim 12, further comprising:
sensing, by the plurality of sensing cells of the capacitive input pad, a plurality of touches by the user on the surface of the capacitive input pad;

determining, for each of the plurality of sensed touches, whether the touch indicates a touch by the left thumb or the right thumb of the user; and determining whether the user is right handed or left handed, based on a frequency of determined touches by the left thumb and by the right thumb.

15. A device, comprising:

a display;

a capacitive input pad coupled to the display, the capacitive input pad including a plurality of sensing cells configured to sense a touch by a user on a surface of the capacitive input pad;

a capacitive sensor element analyzer coupled to the capacitive input pad, the capacitive sensor element analyzer being configured to facilitate distinguishing between contact regions and shadow regions on a surface of the capacitive input pad by comparison of capacitance values with two separate, independent thresholds by at least being configured to receive a respective capacitive value from each respective sensing cell, and to compare the received capacitive value for each sensing cell to a first fixed threshold value and to a second fixed threshold value that is less than the first fixed threshold value, the first and second fixed threshold values being independent of the capacitive values of the plurality of sensing cells; and a shadow analyzer coupled to the capacitive sensor element analyzer, the shadow analyzer being configured to:

determine a contact region by identifying, based on the comparison, a first set of the sensing cells, each sensing cell of the first set having a capacitive value greater than the first fixed threshold value, and determine a shadow region by identifying, based on the comparison, a second set of the sensing cells, each sensing cell of the second set having a capacitive value greater than the second fixed threshold and less than the first fixed threshold value.

16. The device of claim 15 wherein the first and second fixed threshold values represent respective first and second threshold increases in capacitive value above a normal capacitive value for the sensing cells.

17. The device of claim 15, further comprising:

a handedness determination module coupled to the shadow analyzer, the handedness determination module being configured to:

determine a shape and an orientation of the shadow region, and determine, based on the determined shape and orientation of the shadow region, whether the sensed touch indicates a touch by a left thumb or a right thumb of the user.

18. The device of claim 17, the handedness determination module being further configured to determine whether the user is right handed or left handed, based on a frequency of determined touches by the left thumb and by the right thumb.

19. The device of claim 15, the shadow analyzer being further configured to select, based on the determined contact region, at least one of a plurality of input sub-regions on the surface of the capacitive input pad.

20. The device of claim 15, wherein the device includes at least one of: a smart phone, a tablet computer, a set-top box and a personal computing device.

* * * * *